United States Patent
Someya et al.

(10) Patent No.: US 6,219,152 B1
(45) Date of Patent: *Apr. 17, 2001

(54) PRINTER AND INFORMATION PROCESSING APPARATUS

(75) Inventors: Shuji Someya, Tokyo; Kenichi Ono, Koganei, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,889

(22) Filed: Dec. 27, 1996

(30) Foreign Application Priority Data

Jan. 9, 1996 (JP) .................................. 8-001277
Dec. 17, 1996 (JP) .................................. 8-336887

(51) Int. Cl.[7] .................................. H04N 1/00
(52) U.S. Cl. .................. 358/1.16; 358/404; 358/444
(58) Field of Search ............... 395/115, 116, 395/112, 114, 101, 113, 110; 358/404, 444, 1.15, 1.16, 1.17, 434, 435, 436, 437, 439, 441, 442, 468

(56) References Cited

U.S. PATENT DOCUMENTS

| | | | | |
|---|---|---|---|---|
| 5,108,207 | * | 4/1992 | Isobe et al. | 400/70 |
| 5,220,674 | | 6/1993 | Morgan et al. | 395/800 |
| 5,297,246 | * | 3/1994 | Horiuchi et al. | 358/1.11 |
| 5,337,258 | * | 8/1994 | Dennis | 714/47 |
| 5,471,322 | * | 11/1995 | Murata | 358/502 |
| 5,522,028 | * | 5/1996 | Nagata et al. | 358/1.11 |
| 5,592,593 | * | 1/1997 | Speed | 358/1.11 |
| 5,630,029 | * | 5/1997 | KOsukegawa | 395/114 |
| 5,659,669 | * | 8/1997 | Narukawa et al. | 358/1.2 |
| 5,666,558 | * | 9/1997 | Pipkins | 710/31 |
| 5,675,422 | * | 10/1997 | Hara et al. | 358/404 |
| 5,737,503 | * | 4/1998 | Mitani | 395/115 |
| 5,751,923 | * | 5/1998 | Matsuzawa | 395/114 |
| 5,764,869 | * | 6/1998 | Bagley et al. | 395/115 |
| 5,825,993 | * | 10/1998 | Shimura et al. | 395/115 |
| 5,886,793 | * | 3/1999 | Satou | 358/404 |
| 5,898,824 | * | 4/1999 | Kato et al. | 358/1.16 |

FOREIGN PATENT DOCUMENTS 0684546 11/1995 (EP) .
404301473 * 10/1992 (JP) .

* cited by examiner

Primary Examiner—Edward Coles
Assistant Examiner—Joseph R. Pokrzywa
(74) Attorney, Agent, or Firm—Fitzpatrick, Cella, Harper & Scinto (57) ABSTRACT

During print processing based on print data from host computer 100, if memory shortage occurs in RAM 16, information on the occurrence of memory shortage, memory-use status and the like is sent to the host computer 100. The host computer 100 receives the information and allocates a storage area in the RAM 3 based on the information. Form information and the like, registered in the RAM 16 are transferred to the host computer and saved in the allocated storage area, thus expanding an available area of the RAM 16 for printing. When the print processing has been completed, the completion of printing is notified to the host computer 100, so that the saved information is transferred from the host computer 100, and stored into the RAM 16.

13 Claims, 8 Drawing Sheets

PRINTER AND INFORMATION PROCESSING APPARATUS

BACKGROUND OF THE INVENTION

This invention relates to a printer and an information processing apparatus to which the printer is connected.

Recent printers have high-level functions and high-level performances, and uses a memory of a large capacity for necessary output processing.

In addition, there is an increasing need among users to respectively register various data. In response to this request, the size of memories installed in printers are being increased.

However, if the printer has insufficient memory space, "memory-full" status occurs, and the printer stops output processing or performs the output processing at a lower resolution. As a result, the originally desired printed result cannot be obtained.

To mitigate this problem, to delete various data registered by a user (e.g., form data or external character data), a font cache and the like, and utilize memory space obtained by the deletion is considered. This requires re-registering the deleted data, further, in case where printing requiring these registered data is performed without the reregistration, desired printout cannot be obtained.

SUMMARY OF THE INVENTION

The present invention has been made in consideration of the above situation, and has its object to provide a printer which performs printing processing utilizing the memory of a host apparatus so as to perform desired printing in case of memory shortage, and an information processing apparatus as the host to which the printer is connected.

According to the present invention, the foregoing object is attained by providing a printer which is capable of bidirectional communication with a host, and which prints a visible image on a predetermined print medium based on print data from the host, comprising: determination means for, during print processing based on the print data, determining whether or not memory shortage has occurred in a storage area used for printing, in an internal memory; saving means for, if the determination means determines that memory shortage has occurred, saving information, being stored in the memory and being not directly related to the print processing, into the host; and storing means for, when the print processing has been completed, receiving the information saved by the saving means from the host, and storing the information into the memory.

Preferably, in the printer having the above construction, the saving means saves the information into a main memory of the host. This enables highspeed saving.

Preferably, in the printer having the above construction, the saving means saves the information into a secondary storage provided in the host. This increases a unit capacity to be allocated.

Preferably, in the printer having the above construction, the information saved by the saving means includes form information registered in the printer.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

Figure 1:
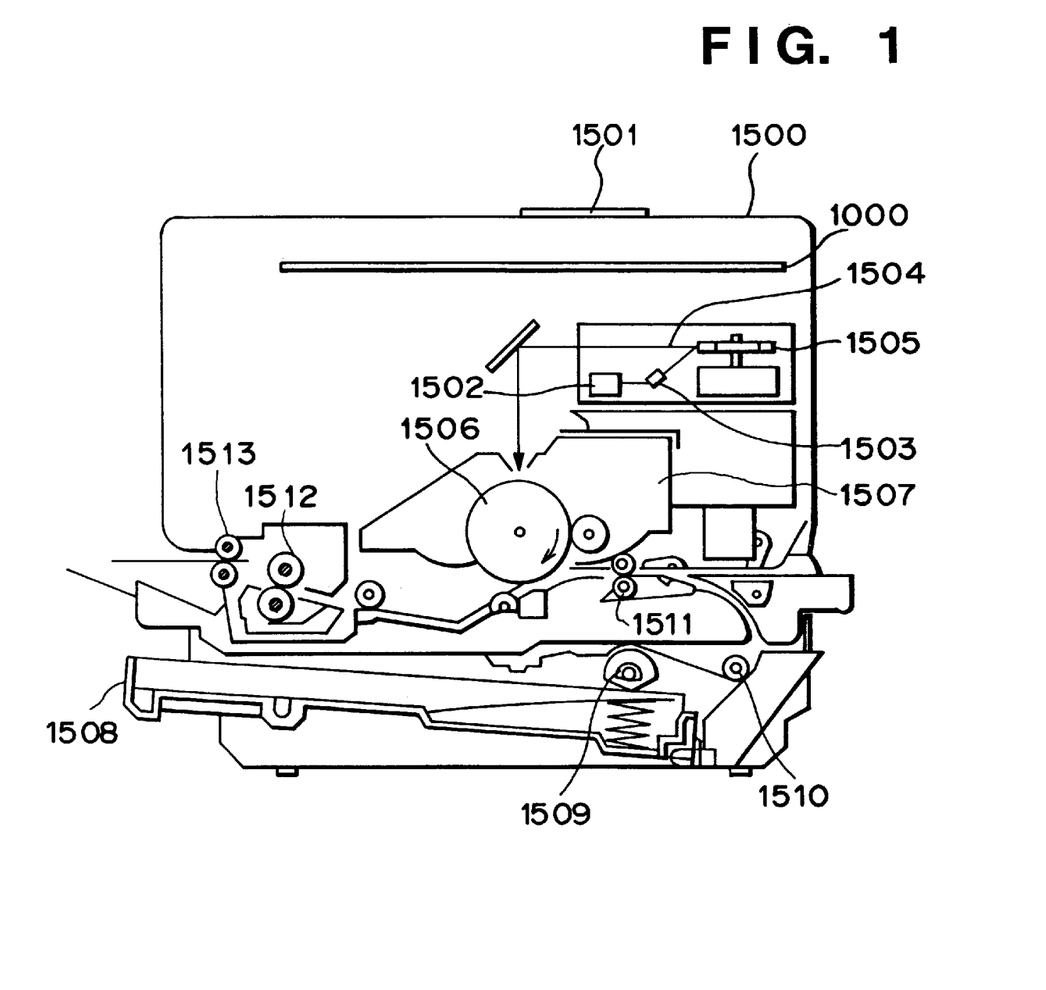
FIG. 1 is a cross-sectional view of a printer according to a first embodiment.

Preferred embodiments of the present invention will now be described in detail in accordance with the accompanying drawings. FIG. 1 is a cross-sectional view showing the structure of a printer (laser-beam printer (LBP)) to which the present invention is applied as a first embodiment. It will be apparent from the following description that the present invention is not limited to the laser-beam printer, but applicable to any type of printer, e.g., an LED printer, a thermal-transfer printer and ink-jet printer.

In FIG. 1, reference numeral 1500 denotes an LBP main body which inputs print information and form information supplied from an external host computer connected to the LBP main body, and perform printing based on the input information. Also, the LBP main body forms character patterns, form patterns and the like, based on the input information, and forms an image on a print sheet as a recording medium. Numeral 1501 denotes an operation panel on which switches for operations, LCD display devices and the like are provided. Numeral 1000 denotes a printer control unit which controls the overall LBP main body 1500, and interprets character information and the like supplied from the host computer. The printer control unit 1000 mainly converts character information into a video signal of a corresponding character pattern, and outputs the video signal to a laser driver 1502. The laser driver 1502 is a circuit for driving a semiconductor laser 1503. The laser driver 1502, by ON/OFF state, controls a laser beam 1504 emitted from the semiconductor laser 1503, based on the input video signal. The laser beam 1504 is swept in the right and left directions by a rotating polygon mirror 1505, and scan-exposes an electrostatic drum 1506. This forms an electrostatic latent image of the character pattern on the electrostatic drum 1506. The latent image is developed by a developing unit 1507 provided around the electrostatic drum 1506, and transferred onto the print sheet.

The print sheet is a cut sheet contained in a paper-cassette 1508 attached to the LBP 1500. The print sheet is fed into the apparatus by a paper-feed roller 1509 and conveyance rollers 1510 and 1511, onto the electrostatic drum 1506. A toner image attached on the electrostatic drum 1506 by the developing unit 1507 is transferred onto the supplied print sheet. Thereafter, the print sheet is conveyed toward a fixer 1512, which fixes the toner. Then the print sheet is discharged by a discharge roller 1513.

The LBP main body 1500 has at least one card slot for connecting an optional card or control card of different language system, in addition to internal font.

Figure 2:
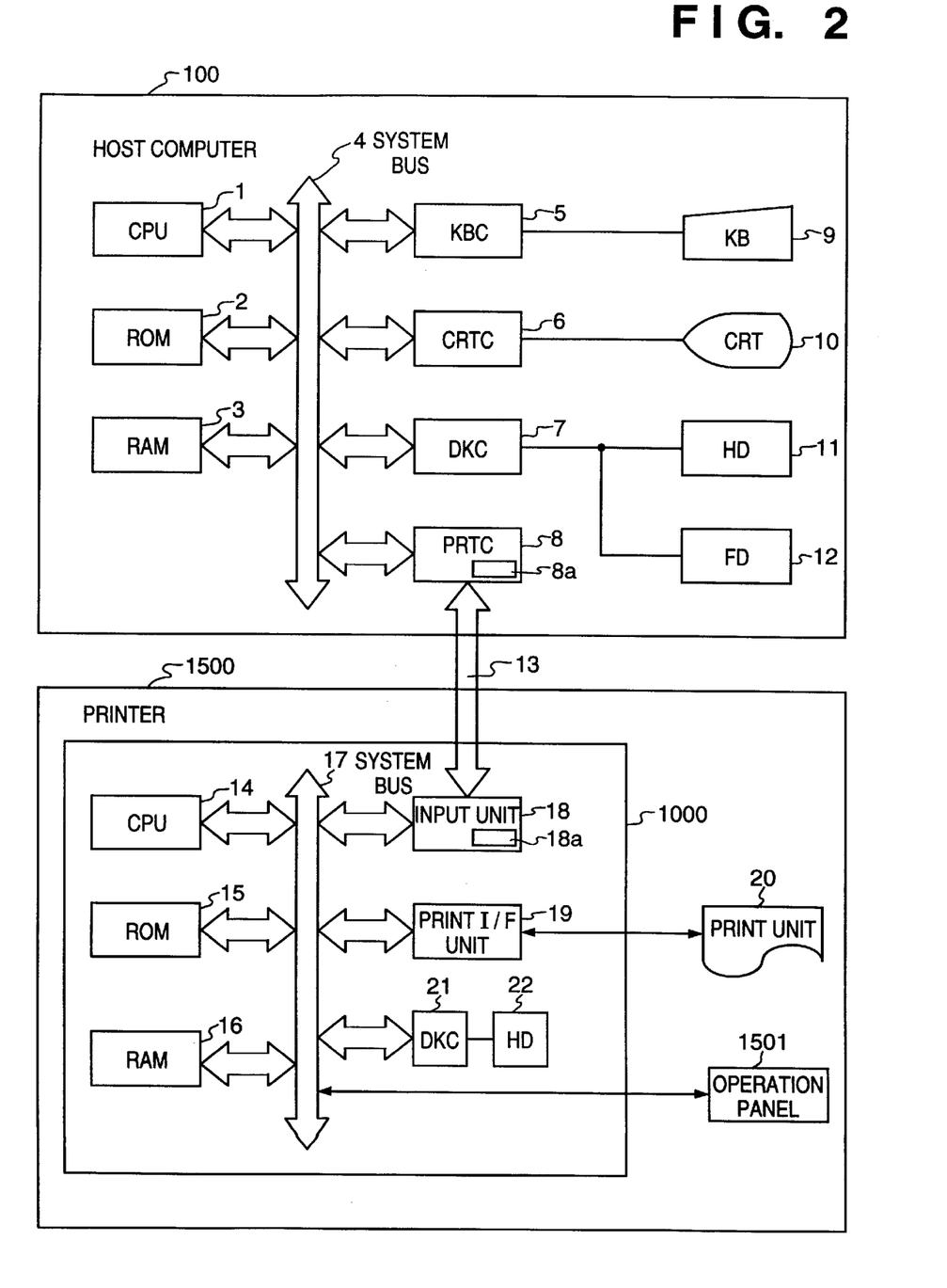
FIG. 2 is a block diagram showing connection between the printer and a host computer and respective constructions.

FIG. 2 shows connection between the LBP main body having the above construction (mainly the printer control unit 1000) and the host computer, and the constituent elements of the respective apparatuses.

Note that the present invention can be applied to a system constituted by a plurality of devices or to an apparatus comprising a single device so far as the function of the present invention can be executed. Further, the present invention can be applied to a system where processing is performed via a network such as a LAN.

In FIG. 2, numeral 100 denotes a host computer having a CPU 1 which executes processing of documents including figures, images, characters, tables and the like, based on a document processing program stored in a ROM 2. The CPU 1 controls respective devices connected to a system bus 4.

Further, a BIOS (Basic Input Output System) and a boot program are stored in the ROM 2. Numeral 3 denotes a RAM used as a main memory and a work area for the CPU 1. Numeral 5 denotes a keyboard controller (KBC) which controls input from a keyboard 9. Numeral 6 denotes a CRT controller (CRTC) which controls the display on a CRT display (CRT) 10. Numeral 7 denotes a disk controller (DKC) which controls access to a hard disk (HD) 11 and a floppy disk (FD) 12 in which an operating system (OS), various application programs, a printer driver, font data, a user file, an editing file and the like are stored. Numeral 8 denotes a printer controller (PRTC) connected to the printer 1500 via a predetermined bidirectional interface 13. The printer controller 8 performs control processing for communication between the printer 1500. Numerals 8a and 18a denote interface circuits which perform processing for communication using various commands and print-information processing between the printer 1500 and the host computer 100.

Note that the CPU 1 performs mapping of outline font in a display-information RAM, provided e.g. on the RAM 3, so that it can perform WYSIWG type display on the CRT 10. Further, the CPU 1 opens various registered windows based on a command designated with a mouse cursor or the like on the CRT 10, and executes the various data processing.

In the printer 1500, numeral 14 denotes a CPU which controls accesses to the respective devices connected to a system bus 17, based on control programs and the like stored in a ROM 15. The CPU 14 outputs an image signal as print data to a print unit (printer engine) 20 connected via a print I/F unit 19.

Figure 3:
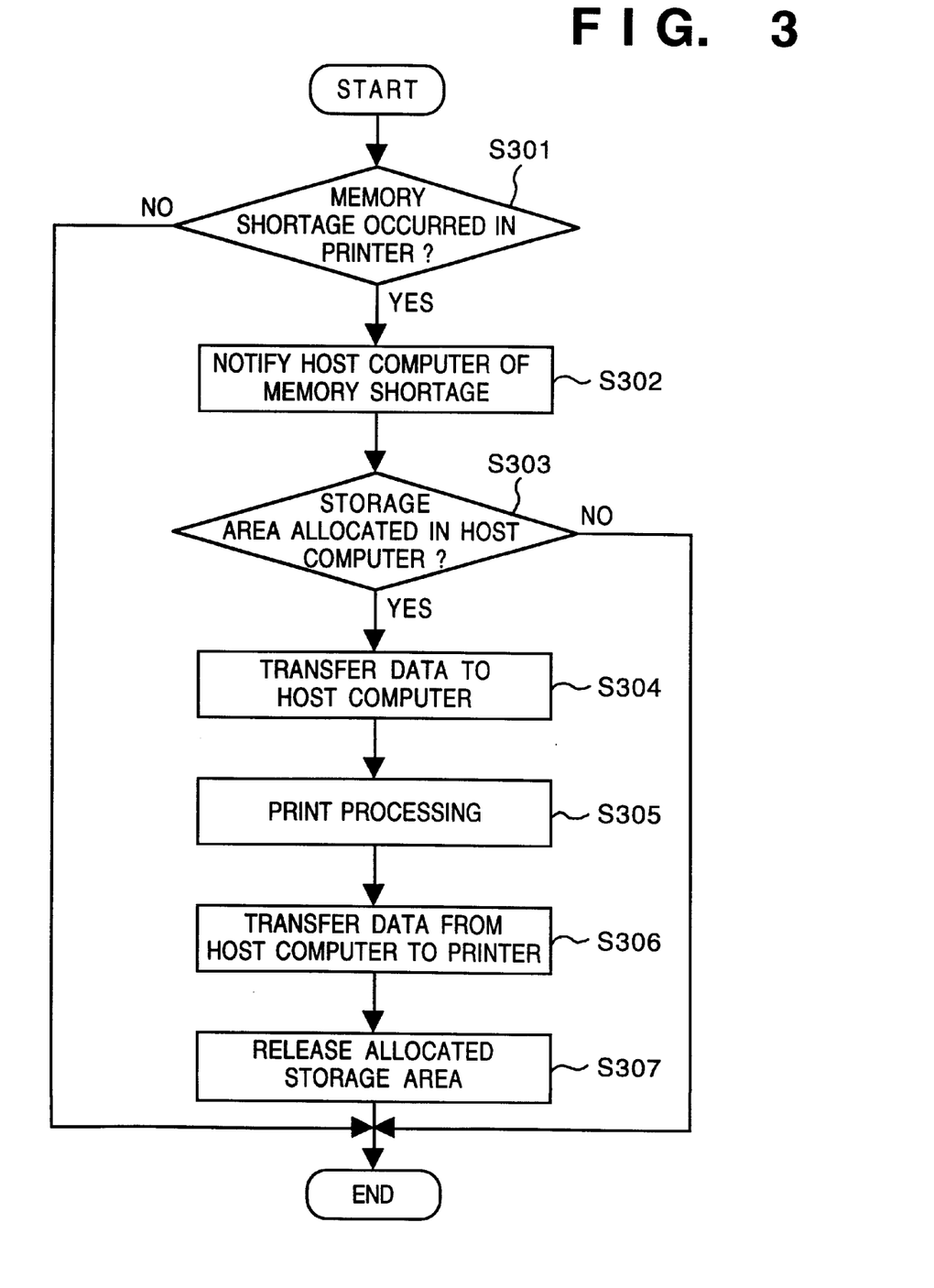
FIG. 3 is a flowchart showing the overall process procedure according to the first embodiment.

The control programs for the CPU 14 (as shown in FIG. 3) and the like are stored in the ROM 15. As the CPU 14 can perform communication processing between the host computer 100 via an input unit 18, it can send RAM 16 memory information, resource data and the like, to the host computer. The RAM 16 is used as a main memory and a work area for the CPU 14. The memory capacity of the RAM 16 can be expanded with an optional RAM card or the like to be connected to an expansion port (not shown). The RAM 16 is also used as a print-data mapping area, an environment-data storage area, and it can be a NVRAM and the like. Numeral 21 denotes a disk controller (DKC) which controls accesses to a hard disk (HD) 22. The hard disk 22 is connected as an optional disk for storing download font and the like.

Further, the printer 1500 has at least one card slot (not shown) for connecting an optional card or a card containing programs for interpreting printer control languages of different language system, in addition to internal font. Furthermore, the printer 1500 has a NVRAM (not shown) for storing printer-mode setting information from the operation panel 1501.

Next, the operation of the first embodiment will be described.

Note that in the following description, the HD 22 is not connected to the printer 1500. The CPU 14 of the printer 1500 performs processing by using only the RAM 16.

The problem in a case where the HD 22 is not connected is that if various forms such as an overlay form are registered in the RAM 16, only a limited area of the entire capacity of the RAM 16 can be used for printing processing.

There is no serious problem upon simple printing, e.g., a document, however, upon complicate printing such as image printing, as the storage area where the forms are registered cannot be used, the memory space may become lacking, which disturbs normal printing.

In the present embodiment, in such case, the form information registered in the RAM 16 and data within a cache memory area of the RAM 16 are transferred to the host computer 100 via the bidirectional interface 13, so that the data can be maintained as temporary unnecessary data. Then, substantially when the entire storage area of the RAM 16 can be allocated to the printing processing (e.g., image mapping, print-data interpretation and use of a reception buffer area), thus attaining normal printing.

FIG. 3 is a flowchart showing processing between the host computer 100 and the printer 1500, according to the first embodiment. As described above, in this embodiment, if the memory space of the RAM 16 becomes short, the printer 1500 of the present embodiment informs the host computer 100 of the memory shortage via the input unit 18 as the interface unit.

At step S301, it is determined whether or not the memory shortage has occurred in the printer 1500. If NO, normal print operation is performed. If YES, i.e., it is determined that the memory shortage has occurred, the process proceeds to step S302, at which memory information, indicating the occurrence of the memory shortage, current memory use status, and a necessary memory capacity for data transfer, is sent to the host computer 100 via the input unit 18.

At step S303, the host computer 100 performs memory allocation to allocate a storage area of the necessary memory capacity (corresponding to the shortage) in the RAM 3 of the host computer 100, based on the memory information received from the printer 1500. Then the host computer 100 determines whether or not a storage area of the necessary memory capacity has been allocated. If NO, normal processing is continued. If YES, i.e., a storage area of the necessary memory capacity has been allocated, the process proceeds to step S304, at which the various registered data (form information etc.) mapped in the RAM 16 and the font cache of the RAM 16 are transferred to the memory of the host computer 100. At step S305, normal print processing is performed. After the completion of the print processing, at step S306, the various data saved in the host computer 100 are transferred to the RAM 16 of the printer 1500. At step S407, the host computer releases storage area allocated in step S303.

Figure 7:
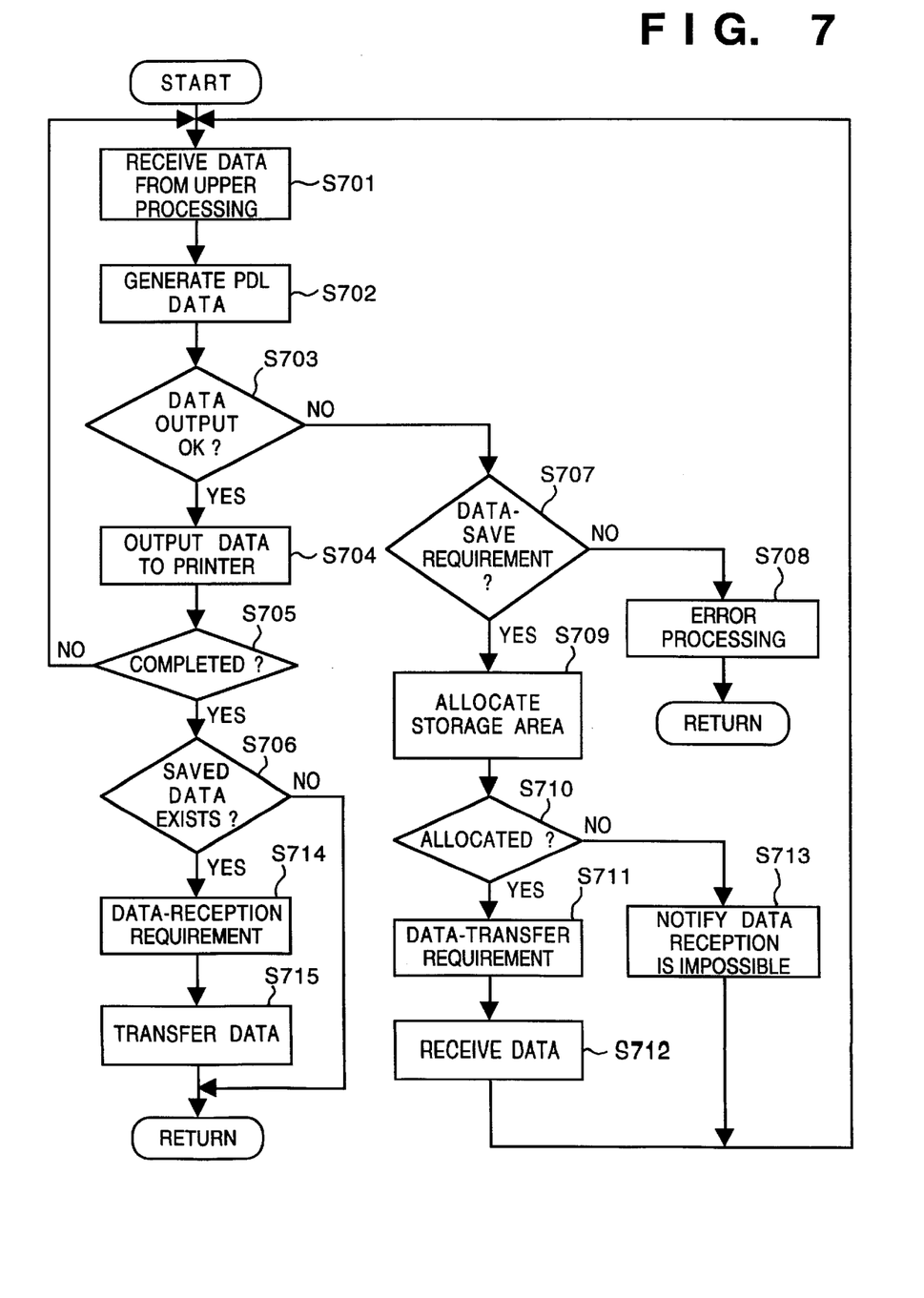
FIG. 7 is a flowchart showing a process procedure of a printer driver for the host computer, according to the first embodiment.

FIG. 7 is a flowchart showing the process procedure of a printer driver program in the host computer 100. The host computer 100, which is a personal computer, for example, is started when printing is designated from a word processor or the like. The printer driver is stored in the HD 11, and is read out to the RAM 3 when the host computer 100 is started.

Next, the process procedure of the CPU 1 of the host computer 100 will be described with reference to FIG. 7.

At step S701, print data is received from upper processing (corresponding to OS or various application programs operate on the host computer 100), and at step S702, the received print data is translated into PDL (Page Description Language) data to be interpreted by the printer 1500.

The process proceeds to step S703, at which it is determined whether or not the PDL data can be sent to the printer 1500. In this embodiment, if error status such as shortage of print-sheet or paper jam has occurred on the printer 1500 side, or if data is received from the printer 1500, the PDL data cannot be sent to the printer 1500.

If it is determined at step S703 that the PDL data can be sent to the printer 1500, the process proceeds to step S704, at which the PDL data is outputted to the printer 1500. The processing at steps S701 to S704 is repeated until it is determined at step S705 that all the PDL data has been transferred.

When all the PDL data has been transferred, the process proceeds to step S706, at which it is determined whether or not there is any saved data. If NO, the process ends. The saved data will be described below.

At step S703, if it is determined that the PDL data cannot be outputted to the printer 1500, the process proceeds to step S707. At step S707, it is determined whether the PDL data cannot be outputted to the printer 1500 due to some error of the printer 1500 side, or due to a data-save request to save the registered form information and the cache memory data in the RAM 16. In case of printer error status (as described above, the shortage of print sheet or paper jam), the process proceeds to step S708, at which error processing (e.g., displaying an error message on a display screen) is performed, and the process ends.

On the other hand, if it is determined at step S707 that a data-save request has been issued from the printer 1500, the process proceeds to step S709, at which the CPU 1 tries to allocate a storage area in the RAM 3 for saving the data. Note that the data-save request includes information indicative of the total amount of data to be saved, so that the CPU 1 tries to allocate an area corresponding to the total amount.

At step S710, it is determined whether or not a storage area has been allocated. If NO, the process proceeds to step S713, at which information indicating that the data to be saved cannot be received is transferred to the printer 1500, then process returns to step S701.

If it is determined at step S710 that a storage area has been allocated, the process proceeds to step S711, at which a saved-data transfer request is outputted to the printer 1500. Then the received data (form information and the like) is stored in the area allocated at step S712.

In the RAM 16 of the printer 1500, if there is a small area available for printing due to registered form information and cache memory data, the registered information and the cache memory data can be saved in the host computer 1500. Thus the CPU 14 of the printer 1500 can use almost all of the area of the RAM 16, which avoids undesired printed result.

After the host computer 100 has received the data saved from the printer 1500, normal PDL data transfer is possible. Accordingly, if it is determined at step S705 that all the PDL data has been transferred, the process proceeds to step S706.

At step S706, if it is determined that saved data exists, the process proceeds to step S714, at which a data-reception request is issued to the printer 1500. The process proceeds to step S715, at which the saved data is outputted, then process ends.

Note that in the above description, the host computer 100 transfers the PDL data, however, the transmitted data is not limited to the PDL data but it may be any form of data.

As described above, in a case where the host computer 100 is a personal computer or a work station, processing corresponding to the flowchart in FIG. 7 is executed by a printer driver program. Generally the printer driver is supplied from a CD-ROM or a floppy disk, therefore it is apparent that the present invention is applicable to a storage medium containing a program.

According to the present embodiment, during a series of print operations, if memory shortage occurs, registered form information and cache memory data in the RAM 16 are saved in the host computer 100 so that almost all the area of the RAM 16 can be used for print processing. When the printing has been completed, the various saved data are downloaded from the host computer to the printer. In this manner, the memory in the printer and the memory in the host computer can be fully utilized.

Note that on the host computer side, after the form information saved from the printer side has been transmitted to the printer side, the memory which has been allocated for the saved information is released for the OS or other application programs.

As described above, in the above processing, if the host computer is a general computer such as a personal computer, the processing on the host computer side is performed by a printer driver program. During print-data output, when a command instructing the use of memory and information on the content of the use of memory is received, the printer driver performs processing to allocate an area in the RAM 16, based on the received information. When an area has been allocated, the driver program notifies the printer of the acquisition of the area by using a command distinguishable from other print data. As the printer side transfers the registered information to the host printer, the printer driver performs processing to save the information received from the printer side into the allocated area. When all the print data has been outputted and a command indicative of the completion of printing is received from the printer side, the printer driver performs processing to transfer the save information to the printer side. At this time, to distinguish the save data from print data, an identification command and information indicative of the total amount of the saved data are first transmitted, then the save data is transmitted.

Note that in the flowchart of FIG. 3, if the printer side CPU 14 determines there is an insufficient storage area in the RAM 16, it transfers, as data to be saved, both of the registered form information and the font cache in the RAM 16. However, the data transfer may be made in accordance with a predetermined priority order. For example, if the amount of memory shortage is less than 1 MB, the form information is transferred to the host computer, on the other hand, if the amount is equal to 1 MB or greater, both of the form information and the cache memory data are transferred to the host computer. This enables control of the amount of data to be saved in the host computer, in accordance with the amount of memory shortage, thus optimizes transfer-processing time for saving the data.

Note that the saving of the font cache data is the second priority because it is desirable to use the font cache in the RAM 16 as long as possible. That is, when the cache memory is available, a character which is frequently used can be bitmapped at high speed, thus maintaining the level of print processing and print speed.

Further, if the received print information includes a command designating to use some form information, registered form information other than the designated form information are saved.

Further, if macro data can be registered in the printer, the macro data may be also saved in the host computer 100. In this case, the relation between the saving priority and the amount of shortage may be pre-stored in the ROM 15.

Note that in the following second and third embodiments, data to be saved may be also saved in a predetermined priority order.

Further, in the above embodiment, when memory shortage has occurred, form information, font cache data and macro information are transferred to the host computer as data to be saved, however, if a storage area for saving these data cannot be allocated on the host computer side, the system indicates an error status. Then it may be arranged such that when the CPU 14 of the printer 1500 is notified of the failure of acquisition of storage area on the host computer 100 side (i.e., it is determined at step S303 that the area has not been allocated), the CPU 14 lowers the resolution of printing.

To lower the resolution, the CPU 14 may control the rotational speed of the rotating polygon mirror 1505, the rotational speed of the electrostatic drum 1506, and the frequency of a conveyance clock for transferring a video signal from the printer control unit 1000 to the laser driver 1502. In a case where printing is performed normally at 600 dpi, if the host computer 100 failed to allocate a storage area and the resolution is lowered to 300 dpi, the size of an area for image-bitmapping to be allocated in the RAM 16 can be reduced to ¼ of that used in the printing in 600 dpi density. This enables high probability of normal printing.

Second Embodiment

Next, the second embodiment of the present invention will be described. Note that the construction of the printer and that of the host computer, and the connection between the printer and the host computer are the same as those shown in FIGS. 1 and 2 of the first embodiment, therefore, the explanations of the construction and the connection will be omitted.

Figure 4:
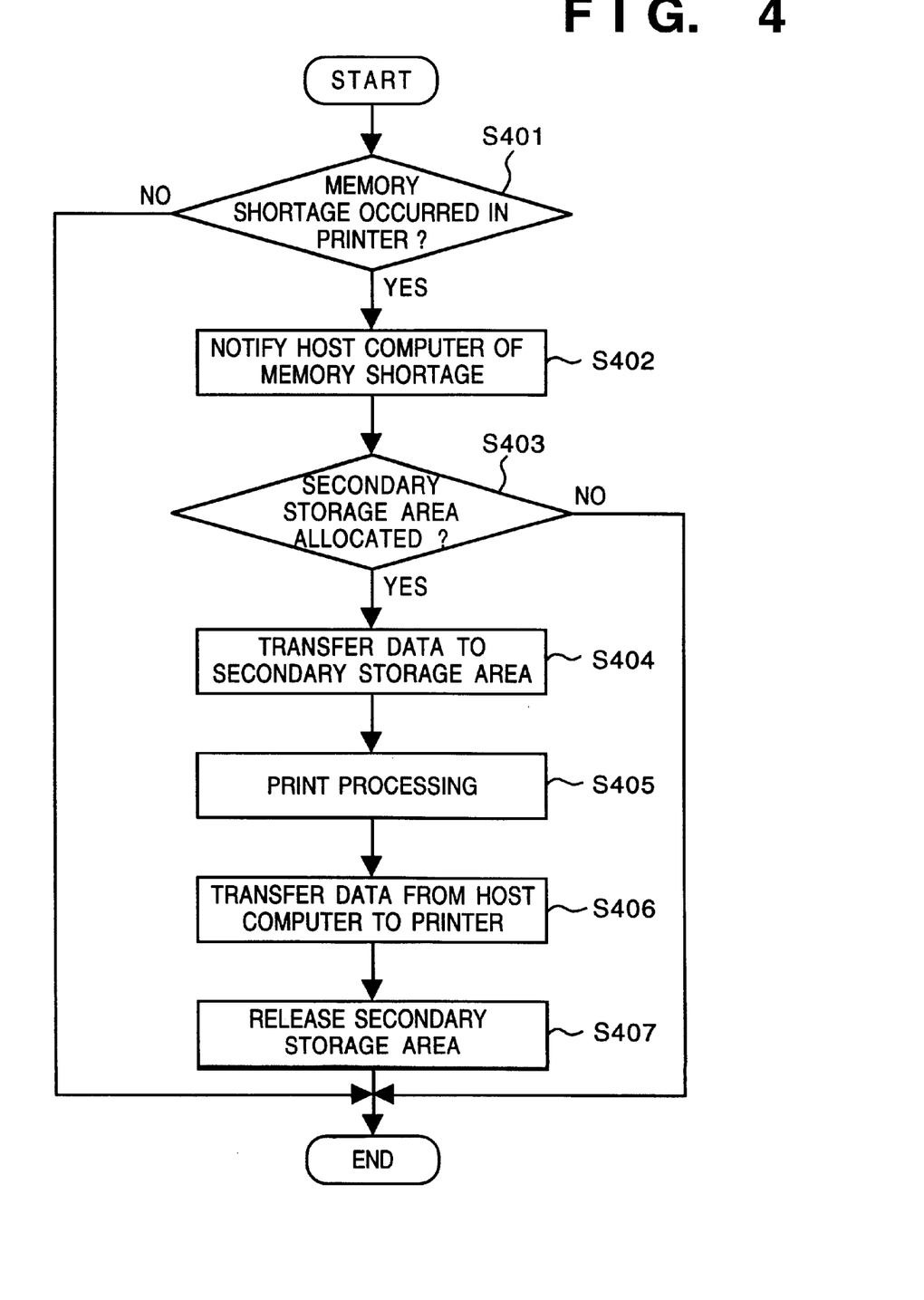
FIG. 4 is a flowchart showing the overall process procedure according to a second embodiment.

FIG. 4 is a flowchart showing processing to utilize a secondary storage (hard disk) 11 in the host computer 100.

At step S401, it is determined whether or not memory shortage has occurred in the printer 1500. If NO, normal print operation is performed. If YES, the process proceeds to step S402, at which memory information indicative of the occurrence of memory shortage, memory use status and a memory capacity necessary for data transfer is sent to the host computer 100. At step S403, the host computer 100 allocates a storage area of the necessary memory capacity in the secondary storage 11, based on the memory information from the printer 1500. If a storage area has been allocated in the secondary storage 11, information indicative of the acquisition of the storage area is transmitted to the printer 1500. The CPU 14 of the printer 1500 receives this information, and at step S404, transfers various registered data and font cache data in the RAM 16 to the host computer 100. The CPU 1 of the host computer 100 stores the received data into the secondary storage 11. At step S405, normal print processing is performed. After the print processing has been completed, the various data saved in the secondary storage 11 are transferred to the printer 1500 at step S406, then the CPU 14 stores the data into the RAM 16 respectively in the original forms. At step S407, the host computer releases the secondary storage area allocated in step S403.

Note that the processing on the host computer 100 is substantially the same as that shown in FIG. 7 except that the data to be saved are stored in the HD 11 instead of the RAM 3. Accordingly, the explanation of the processing on the host computer 100 side will be omitted.

Further, similar to the first embodiment, the form information, the font cache and the macro data are saved in the host computer, in accordance with a predetermined priority order, corresponding to the amount of memory shortage.

Further, similar to the first embodiment, when failure of acquisition of storage area in the host computer 100 is notified (i.e., it is determined at step S403 that the storage area has not been allocated), the print resolution can be lowered.

Note that the above processing shows the operation when the hard disk 22 is not connected to the printer 1500. Accordingly, in a case where the hard disk 22 is connected to the printer 1500 and an available area is not allocated, the hard disk 22 can be used in place of the secondary storage 11. Further, it may be arranged such that the above processing is performed when an available area has not been allocated in the hard disk 22.

Third Embodiment

Next, the third embodiment of the present invention will be described. Note that in this embodiment, the structure of the host computer and that of the printer are the same as those of the first embodiment.

Figure 5:
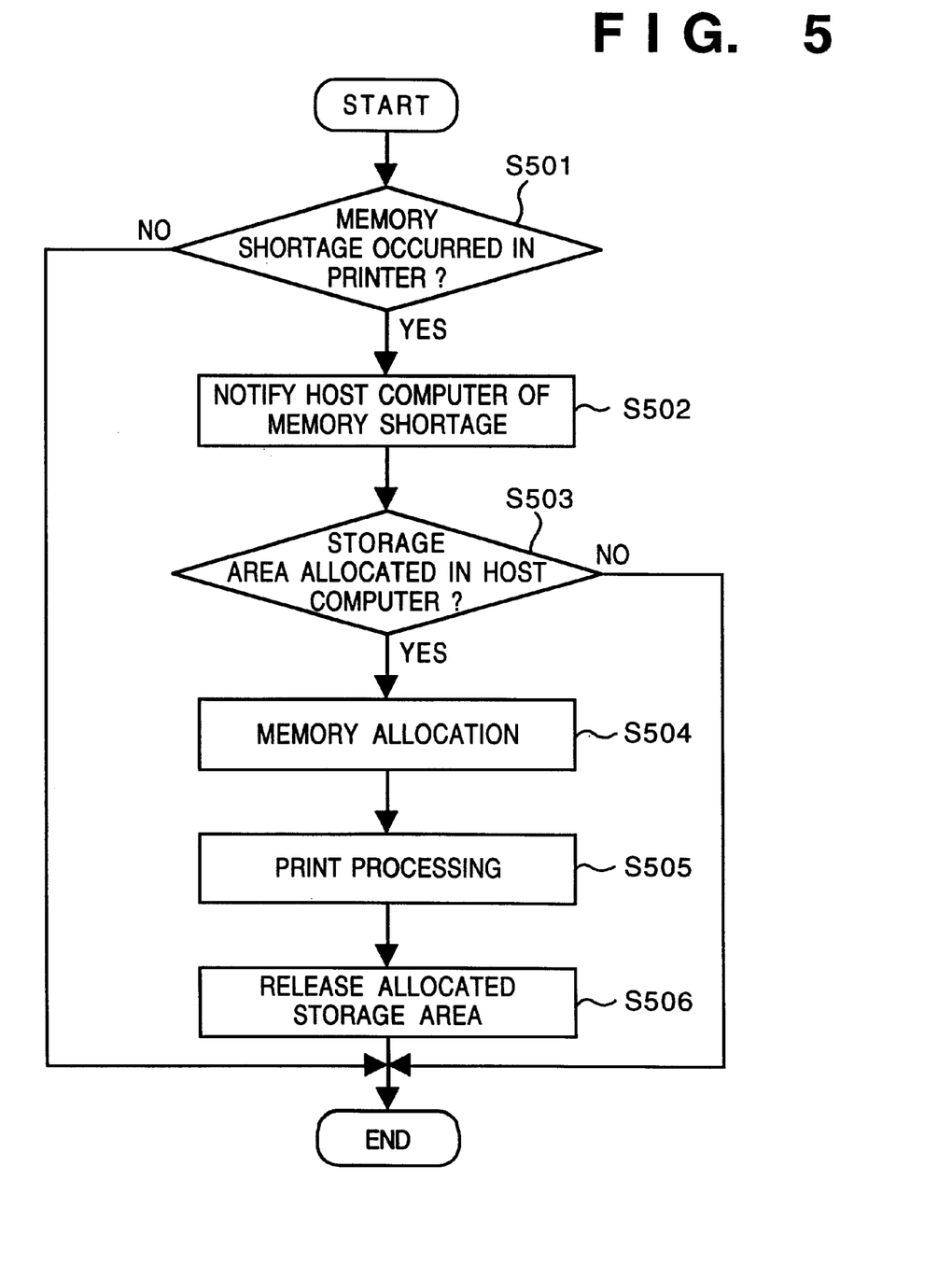
FIG. 5 is a flowchart showing the overall process procedure according to a third embodiment.

FIG. 5 is a flowchart showing processing between the printer and the host computer in a case where the memory of the host computer is temporarily allotted as a printer memory.

First, at step S501, it is determined whether or not memory shortage has occurred in the printer 1500. If NO, normal print operation is performed. However, if YES, the process proceeds to step S502, at which memory information indicative of the occurrence of memory shortage, current memory use status and a memory capacity necessary for data transfer is transferred to the host computer 100.

The host computer 100 allocates a storage area of the necessary amount in the RAM 3, based on the memory information from the printer 1500. When a storage area has been allocated on the host computer side, the area is allocated as a virtual memory for the printer at step S504. At step S505, normal print operation is performed by using the allocated virtual memory. After the print processing has been completed, the storage area allocated in the host computer is released at step S506.

Figure 8:
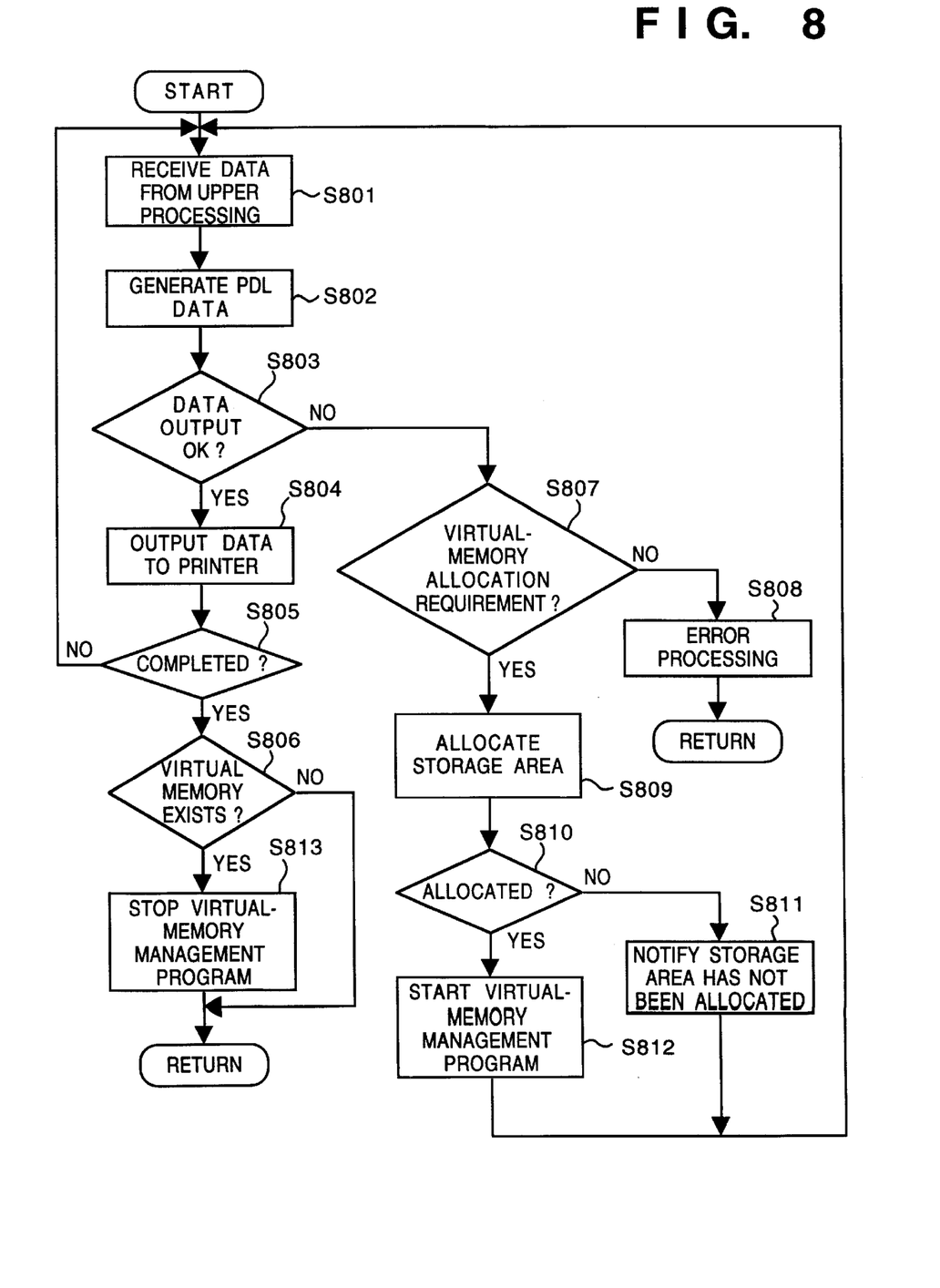
FIG. 8 is a flowchart showing a process procedure of a printer driver for the host computer, according to the third embodiment.

FIG. 8 is a flowchart showing a process procedure of a printer driver program in the host computer 100, according to the third embodiment.

Next, the process procedure of the CPU 1 on the host computer 100 side will be described with reference to the flowchart of FIG. 8.

First, at step S801, print data is received from upper processing (corresponding to various application program which operate on the host computer 100). At step S802, the received print data is translated into PDL data which the printer 1500 can interpret.

At step S803, it is determined whether or not the PDL data can be transferred to the printer 1500. If YES, the process proceeds to step S804, at which the PDL data is outputted to the printer 1500. Then, the processing at steps S801 to S804 is repeated until it is determined at step S805 that all the PDL data has been transferred.

When the transfer of the PDL data has been completed, the process proceeds to step S806, at which it is determined whether or not a virtual memory for the printer exists. If NO, the process ends.

At step S803, if it is determined that the PDL data cannot be outputted to the printer, the process proceeds to step S807. At step S807, it is determined whether the PDL data cannot be outputted to the printer 1500 due to an error on the printer 1500 side, or due to a virtual-memory acquisition request from the printer 1500. In case of printer error (i.e., shortage of print-sheet or paper jam as described above), the process proceeds to step S808, at which error processing (i.e., displaying an error message on a display screen as described above) is performed, and the process ends.

On the other hand, if it is determined that the virtual-memory acquisition request has been issued by the printer 1500, the process proceeds to step S809, at which the CPU 1 tries to allocate a virtual memory area in the RAM 3. Note that as the virtual-memory acquisition request includes information indicative of a memory capacity to be allocated, the CPU 1 tries to allocate a virtual memory area corresponding to the capacity.

At step S810, it is determined whether or not the virtual memory area has been allocated. If NO, the process proceeds to step S811, at which the failure of the acquisition of virtual memory area is notified to the printer, then the process returns to step S801.

If it is determined that the virtual memory area has been allocated, the process proceeds to step S812, at which a virtual-memory management program stored in the HD 11 is started. Note that the virtual memory is a well-known art, therefore the explanation of the virtual memory will be omitted. The feature of the third embodiment is managing the virtual memory in the RAM 3 in accordance with an instruction from the printer.

As described above, if there is an insufficient area in the RAM 16 of the printer 1500 due to registered form information and a cache memory area, the RAM 3 of the host computer 100 can be used as a virtual memory. This avoids undesired printed result.

When the host computer 100 has allocated a virtual memory for the printer 1500, normal PDL data can be transferred. Accordingly, if it is determined at step S805 that all the PDL data has been transferred, the process proceeds to step S806.

At step S806, if it is determined that a virtual memory exists, the process proceeds to step S813, at which the virtual-memory management program is stopped, then the virtual memory area in the RAM 3 is released, and the process ends.

As described above, in a case where the host computer 100 is a personal computer or a work station, the processing corresponding to the flowchart of FIG. 7 is executed by a printer driver program. Generally the printer driver is supplied from a CD-ROM or a floppy disk, therefore it is apparent that the present invention is applicable to a storage medium containing a program.

Further, similar to the first embodiment, form information, a font cache, further a macro data can be saved in the host computer in accordance with a predetermined priority order, corresponding to the amount of memory shortage.

Further, similar to the first embodiment, if the failure of acquisition of storage area in the host computer 100 is notified (i.e., it is determined at step S503 that a storage area has not been allocated), the print resolution can be lowered.

According to the third embodiment, the CPU 14 of the printer can use the memory of the host computer as a virtual memory which is like the printer's own memory.

Fourth Embodiment

Next, a fourth embodiment of the present invention will be described. In the fourth embodiment, the construction of the host computer and that of the printer are the same as those of the first embodiment.

Figure 6:
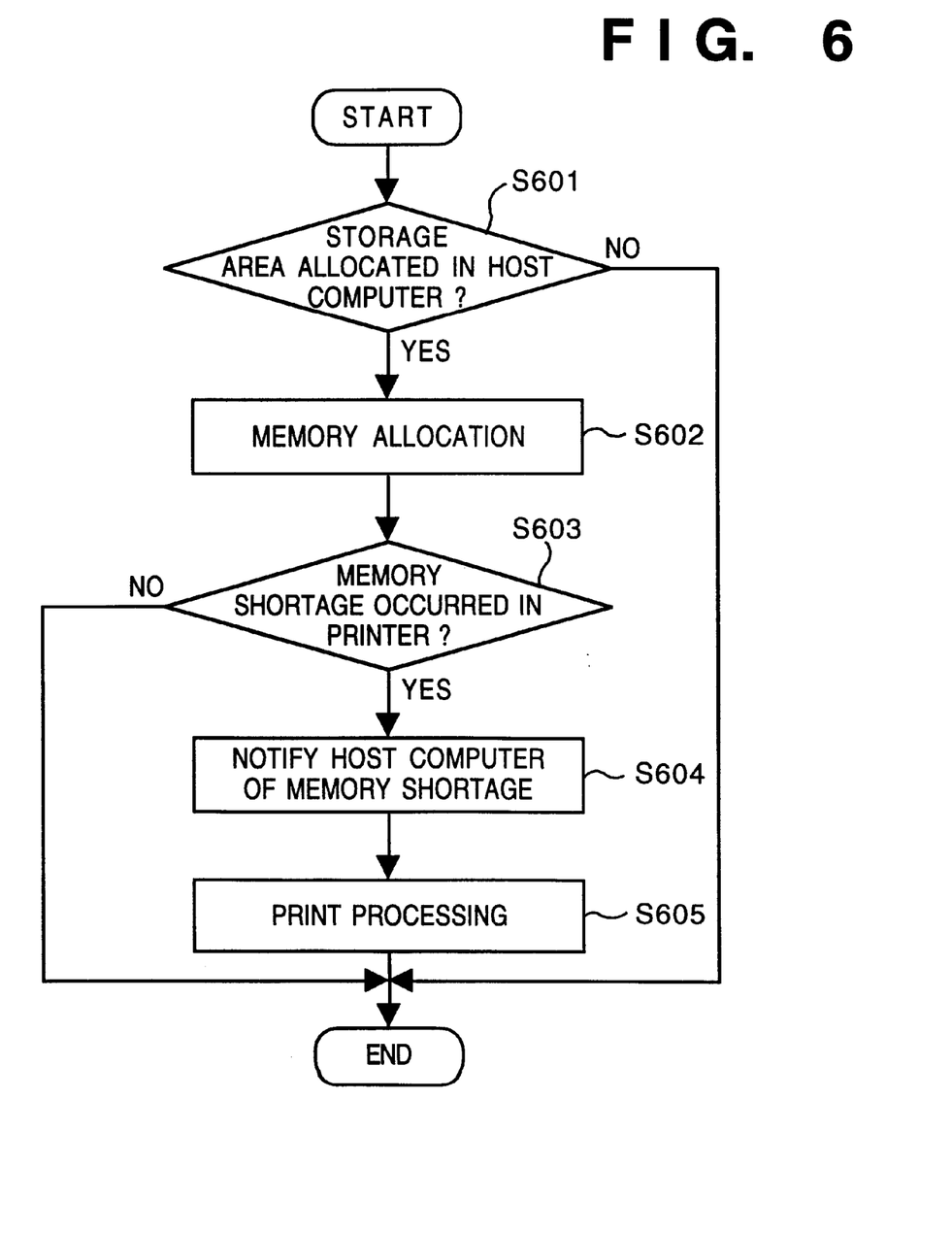
FIG. 6 is a flowchart showing the overall process procedure according to a fourth embodiment.

FIG. 6 is a flowchart showing the processing between the printer and the host computer when the memory of the host computer is allocated as a printer memory.

At step S601, the host computer 100 allocates a storage area of a necessary amount from the RAM 3. When a storage area is allocated on the host computer side, the area is allocated as a virtual memory for the printer is made at step S602. At step S603, it is determined whether or not memory shortage has occurred in the printer 1500. If NO, normal print operation is performed. If YES, the occurrence of memory shortage is notified to the host computer 100 at step S604. At step S605, the allocated virtual memory area is used for normal print processing.

As described above, according to the present invention, in a printer connected to a host computer via a bidirectional interface, if memory shortage occurs, memory information of the printer is transferred to the host computer by using the bidirectional interface, and the information is utilized to allocate a storage area of the host computer to save registered data and a cache memory of the printer, otherwise to allocate a storage area as a virtual memory area for the printer. Thus a desired printed result can be obtained without stoppage of printer or degradation of print resolution.

Further, the above construction eliminates necessity to delete various data registered by a user and a font cache then to re-register the data and perform re-caching.

Furthermore, additional costs for expansion of the memory of the printer can be reduced as much as possible.

According to the third and fourth embodiments, although the CPU 14 on the printer 1500 side can utilize a storage area allocated in the RAM 3 of the host computer 100 as a virtual memory, the access speed using this memory is lower than that using the RAM 16. However, in these embodiments, it is not necessary to transfer data registered in the RAM 16 such as form information to the host computer 100 side, therefore, time for such transfer is not required. Further, if the host computer 100 has a sufficient storage area, using the allocated memory equals expanding the RAM 16. In printing based on PDL, whatever complicated image it represents, undesired printed result can be avoided.

Further, if the failure of acquisition of storage area in the host computer 100 is notified (i.e., it is determined at steps S503 and S601 that a storage area has not been allocated), the print resolution may be lowered.

Note that in the embodiments, the printer is a laser-beam printer, however, the present invention is not limited by a printing method itself. Therefore, the present invention can be applied to any type of printer.

Also, the host computer may be any type of device, further, it may be any OS that runs on the device.

In the above processing, to perform at least communication with a host so as to allocate a necessary storage area, a program for a corresponding processing in the host is required. Therefore, the invention is applicable to a case where the invention is embodied by supplying a program to a system or apparatus. In this case, a storage medium, storing a program according to the invention, constitutes the invention. The system or apparatus operates in a predetermined manner by reading the program from the medium into the system or the apparatus.

Further, in a case where the host itself does not have a function (program) to perform the above processing, the printer that has notified the host of memory shortage will receive no response from the host, otherwise, the printer will not receive an expected command. In this case, to perform at least print processing in the printer of the embodiments, normal print processing is performed.

The present invention can be applied to a system constituted by a plurality of devices or to an apparatus comprising a single device.

As described above, according to the present invention, print processing while utilizing a memory of an host enables desired printing even in case of memory shortage.

The present invention is not limited to the above embodiments and various changes and modifications can be made within the spirit and scope of the present invention. Therefore, to appraise the public of the scope of the present invention, the following claims are made.

What is claimed is:

1. A printer which is capable of bidirectional communication with a host, and which prints a visible image on a predetermined print medium based on print data from the host, comprising:

a determiner, adapted to determine whether or not a memory shortage occurs in a storage area used for printing, in an internal memory of the printer during print processing based on the print data;

a first transferor, adapted so that if said determiner determines that a memory shortage occurs, it transfers a command, indicating that the memory shortage has occurred, to the host so as to have the host allocate area in a memory of the host;

a second transferor, adapted so that, after the host has allocated the area in the memory of the host, it transfers information, being stored in said internal memory and not being used in the print processing in progress, to the memory of the host so as to have the host keep the information until completion of the print processing; and a downloader, adapted to, after the print processing has been completed, download the information transferred by said second transferor and temporarily kept in the host, and storing the information into said internal memory of the printer.

2. The printer according to claim 1, wherein said second transferor transfers the information into a main memory of said host.

3. The printer according to claim 1, wherein said second transferor transfers the information into a secondary storage provided in said host.

4. The printer according to claim 1, wherein the information saved by said second transferor includes form information registered in said printer.

5. An information processing apparatus connected to a printer as a peripheral apparatus, via a bidirectional communication interface, comprising:

a first sender, adapted to send print data to said printer;

a determiner, adapted such that when a notification of memory shortage has been received from said printer after the print data is sent to said printer by said sender, to determine whether or not a storage area of a capacity designated by the notification can be allocated;

a memory allocator, adapted so as, if said determiner determines that the storage area of the capacity can be allocated, to allocate the storage area;

a storer, adapted to receive data to be saved, stored in a memory of said printer and being other than print data, from said printer in response to the notification of allocation, and to store the received data into the storage area allocated by said memory allocator; and a transferor, adapted so as, when printing based on the print data has been completed, to transfer the data stored by said storer, to said printer, in a form interpretable by said printer.

6. The information processing apparatus according to claim 5, wherein said memory allocator allocates the storage area in a main memory of said host.

7. The information processing apparatus according to claim 5, wherein said memory allocator allocates the storage area in a secondary storage of said host.

8. The information processing apparatus according to claim 5, wherein the data to be saved includes form information registered in said printer.

9. The information processing apparatus according to claim 5, wherein the storage area allocated by said memory allocator functions as a virtual memory for said printer.

10. A method for a printer which is capable of bidirectional communication with a host, and which prints a visible image on a predetermined print medium based on print data from the host, said method comprising the steps of:

determining whether or not memory shortage occurs in a storage area used for printing, in an internal memory of the printer during print processing based on the print data;

transferring, if it is determined in the determining step that a memory shortage occurs, a command, indicating that the memory shortage has occurred, to the host so as to have the host allocate area in a memory of the host;

transferring information, after the host has allocated the area in the memory of the host, which is stored in the internal memory and is not being used in the print processing in progress, to the memory of the host so as to have the host keep the information until completion of the print processing; and downloading, after the print processing has been completed, the information transferred in said information transferring step and temporarily kept in the host, and storing the information into the internal memory of the printer.

11. A computer-usable medium storing instructions for a printer which is capable of bidirectional communication with a host, and which prints a visible image on a predetermined print medium based on print data from the host, said instructions comprising instructions for causing the printer to:

determine whether or not memory shortage occurs in a storage area used for printing, in an internal memory of the printer during print processing based on the print data;

transfer, if it is determined by execution of said determining instructions that a memory shortage occurs, a command, indicating that the memory shortage has occurred, to the host so as to have the host allocate area in a memory of the host;

transfer information, after the host has allocated the area in the memory of the host, which is stored in the internal memory and is not being used in the print processing in progress, to the memory of the host, so as to have the host keep the information until completion of the print processing; and download, after the print processing has been completed, the information transferred and temporarily kept in the host, and store the information into the internal memory of the printer.

12. A method for an information processing apparatus connected to a printer as a peripheral apparatus, via a bi-directional communication interface, said method comprising the steps of:

sending print data to said printer;

determining, when a notification of memory shortage has been received from said printer after the print data is sent to the printer in said sending step, whether or not a storage area of a capacity designated by the notification can be allocated;

allocating, if it is determined in said determining step that the storage area of the capacity can be allocated, a storage area;

receiving data to be saved, which is stored in a memory of the printer and is other than print data, from said printer in response to the notification of allocation, and storing the received data into the storage area allocated in said allocating step; and transferring, when printing based on the print data has been completed, the data stored in said receiving and storing step, to the printer, in form interpretable by the printer.

13. A computer-usable medium storing instructions for an information processing apparatus connected to a printer as a peripheral apparatus, via a bi-directional communication interface, said instructions comprising instructions for causing the apparatus to:

send print data to said printer;

determine, when a notification of memory shortage has been received from said printer after the print data has been sent to the printer upon the execution of said sending instruction, whether or not a storage area of a capacity designated by the notification can be allocated;

allocate, if it is determined by said determining instructions that the storage area of the capacity can be allocated, the storage area;

receive data, which is stored in a memory of the printer and is other than print data, from said printer in response to the notification of allocation, and store the received data into the storage area allocated by said allocating instructions; and transfer, when printing based on the print data has been completed, the data stored by said storing instructions, to the printer, in form interpretable by the printer.

\* \* \* \* \*

UNITED STATES PATENT AND TRADEMARK OFFICE
CERTIFICATE OF CORRECTION

PATENT NO.    : 6,219,152 B1                                           Page 1 of 1
DATED         : April 17, 2001
INVENTOR(S)   : Shuji Someya et al.

It is certified that error appears in the above-identified patent and that said Letters Patent is hereby corrected as shown below:

Title page,
Item [56], References Cited, U.S. PATENT DOCUMENTS, "KOsukegawa" should read -- Kosukegawa --.

Column 4,
Line 66, "S407" should read -- S307 --.

Column 10,
Line 12, "printer is made at step S602" should read -- printer, at step S602. --.

Column 11,
Line 10, "an" should read -- a --.

Signed and Sealed this

Fifteenth Day of July, 2003

JAMES E. ROGAN
*Director of the United States Patent and Trademark Office*